Aug. 24, 1965 R. NEUSCHOTZ 3,202,195
SELF TAPPING INSERT HAVING INTERNAL LOCK
Filed Sept. 30, 1963 2 Sheets-Sheet 1
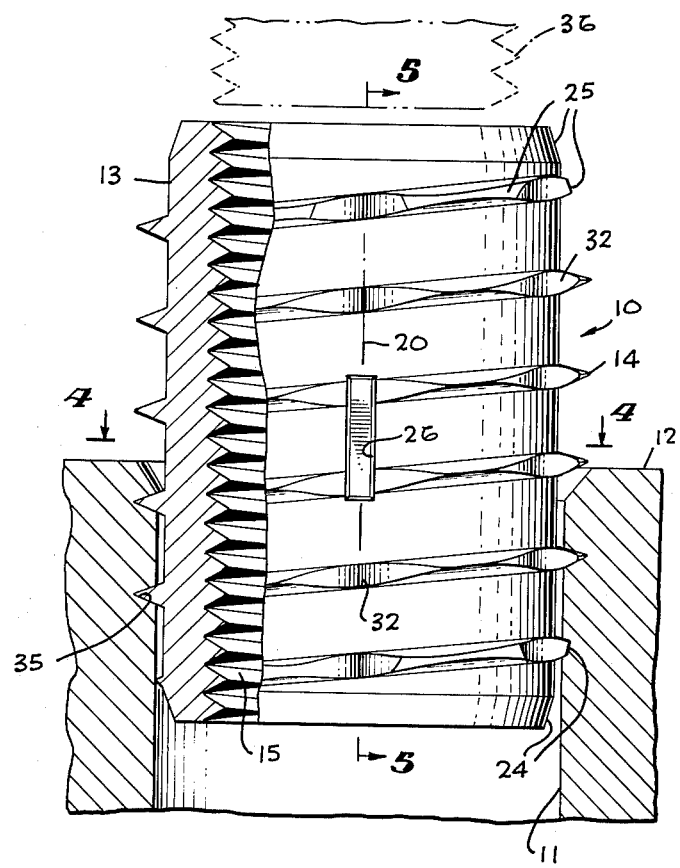
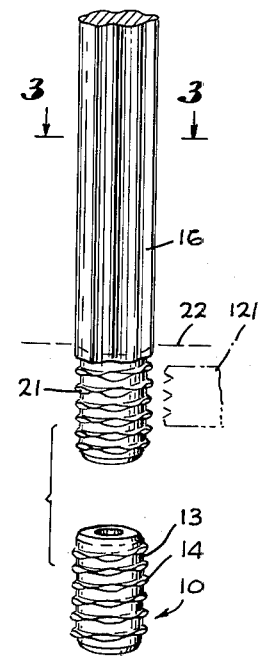
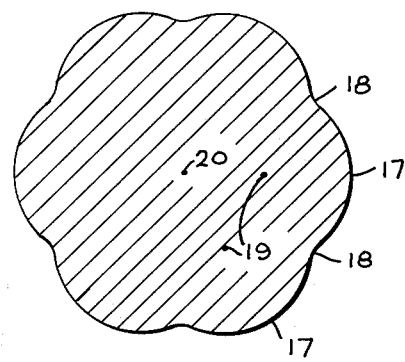
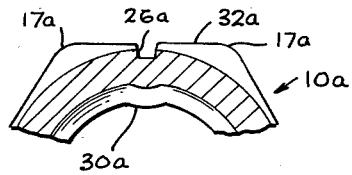
ROBERT NEUSCHOTZ
INVENTOR.
BY William P. Green
ATTORNEY

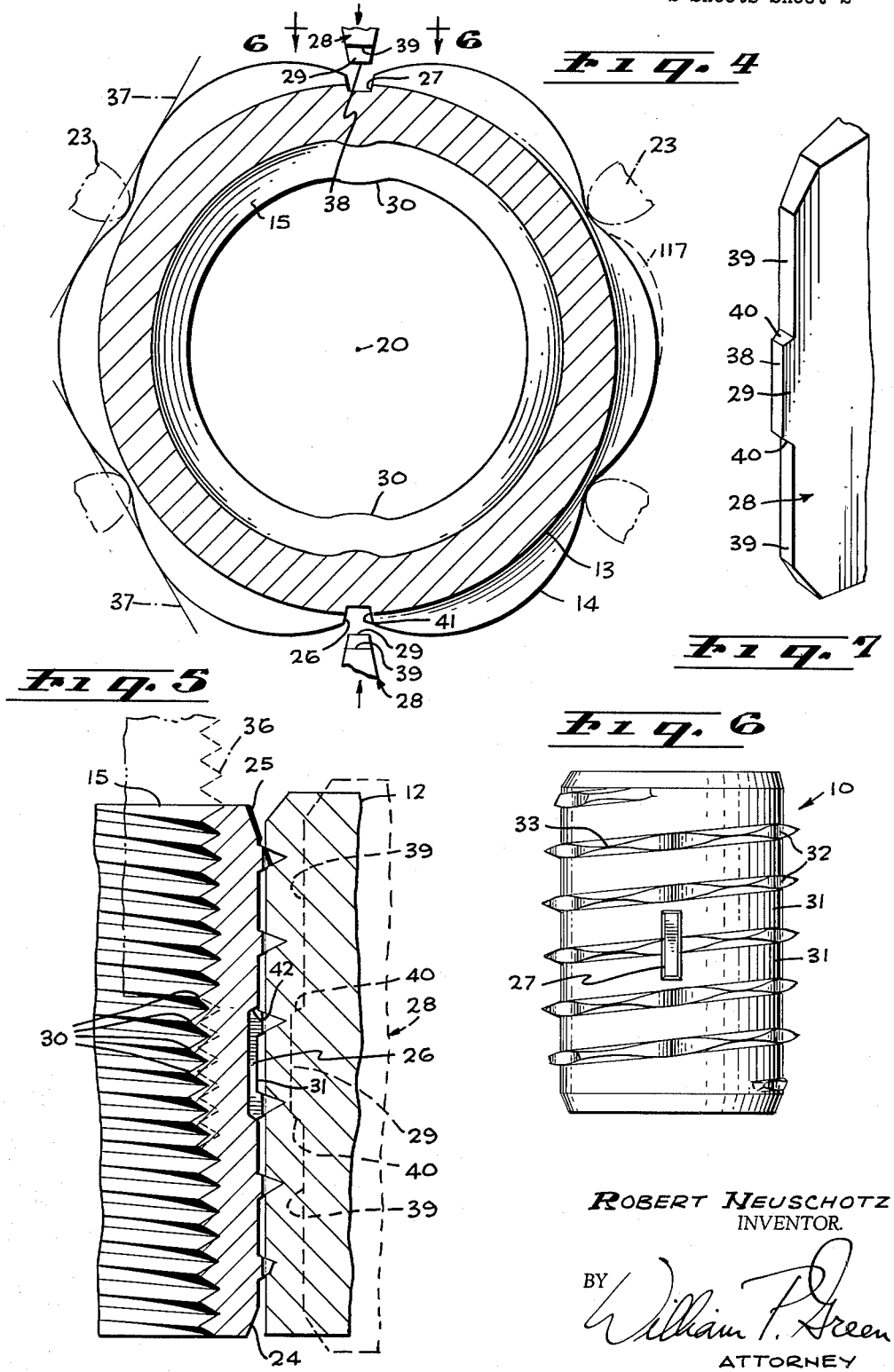

United States Patent Office 3,202,195
Patented Aug. 24, 1965

3,202,195
SELF TAPPING INSERT HAVING
INTERNAL LOCK
Robert Neuschotz, 1162 Angelo Drive,
Beverly Hills, Calif.
Filed Sept. 30, 1963, Ser. No. 312,605
5 Claims. (Cl. 151—21)

This invention relates to an improved internally and externally threaded insert, adapted to be screwed into a carrier part and receive a coacting stud, to thereby secure the stud to the carrier part by means of the insert. Inserts embodying the invention represent improvements on the general type of device disclosed and claimed in my copending application Serial Number 214,939, filed August 6, 1962, on "Threaded Elements With Self Tapping Peaks and Recesses." Certain features of method novelty relating to the present inserts are covered in my copending application Serial Number 312,606, entitled "Method of Forming Self Tapping Insert Having Internal Lock," filed September 30, 1963.

The inserts disclosed in my above identified application Serial Number 214,939 are of a type having external threads which are truncated to progressively vary in depth so that the threads present or form alternate peaks and reduced radius (preferably inwardly recessed) portions, as the threads advance circularly about the periphery of the insert. The peaks thus formed on the external threads of the insert act as thread forming elements, which function to form mating threads in the inner surface of an initially unthreaded bore in a carrier part, when the insert is screwed into that bore. These peaks also serve as self locking elements, to effectively retain the insert against unscrewing movement from the carrier part after installation therein.

A major object of the present invention is to provide an improvement on an insert of the above discussed type, for rendering the insert internally self locking with respect to a stud which is screwed into the insert, so that the stud is frictionally held against unscrewing movement. More particularly, the purpose of the invention is to devise an arrangement for thus rendering the insert internally self locking in an extremely simple and inexpensive manner, but in a relation to the peaked external threads such that the internal locking characteristics cannot in any way detract from the thread forming and self locking action of the external threads. In this connection, it has been noted that proper functioning of the external threads depends very critically on maintainance of an accurately controlled cross-sectional configuration of the threads at the locations at which the threads contact the carrier part, and consequently any type of internal thread locking arrangement which would require deformation of those portions of the external threads is completely unsuitable for use in forming the present inserts.

With more particular reference now to the manner in which the internal self locking action is attained, I provide for this action by locally deforming the side wall of the insert body radially inwardly at a particular location relative to the external threads, to correspondingly locally deform the internal threads to a reduced diameter condition in which the stud must be forced into and through the resulting self locking portion of the internal threads. In order to avoid interference by such deformation of the insert body with proper functioning of the external threads, I purposely effect the inward deformation at the location of one or more of the minimum radius portions of the external threads, and avoid deforming the threads at the peak locations. The peaks then permanently retain their predetermined uniquely truncated configuration, without alteration of that configuration by the localized deforming action, so that maximum effectiveness of both the internal and external threads is attained in a single unit. For optimum results, the inward deformation is effected along an axially elongated area, of an extent sufficient to deform inwardly localized portions of a plurality of adjacent turns of the internal threads.

The above and other features and objects of the invention will be better understood from the following detailed description of the typical embodiment illustrated in the accompanying drawing, in which:

FIG. 1 is a side view, partially in section, illustrating an insert constructed in accordance with the invention, as it appears during installation in a carrier part;

FIG. 2 is a perspective representation of an initial portion of the process utilized in manufacturing the insert of FIG. 1;

FIG. 3 is an enlarged transverse section taken on line 3—3 of FIG. 2;

FIG. 4 is a transverse section through the insert of FIG. 1, taken on line 4—4 of FIG. 1, and illustrating somewhat diagrammatically certain steps in the manufacture of the insert;

FIG. 5 is an axial section taken on line 5—5 of FIG. 1;

FIG. 6 is a reduced side view taken on line 6—6 of FIG. 4;

FIG. 7 is a perspective of one of the deforming hammers; and

FIG. 8 is a representation similar to FIG. 4 of a second form of the invention.

Referring first to FIG. 1, I have illustrated at 10 a tubular insert constructed in accordance with the invention, as it appears during installation within an initially unthreaded cylindrical bore 11 in a carrier part 12. The insert 10 has an essentially tubular body 13 presenting external threads 14 to be screwed into the carrier part, and internal threads 15 for receiving a threaded stud or bolt which is to be connected to the carrier part through the medium of the insert.

To bring out the method of manufacture of insert 10, reference is next made to FIG. 2, which shows at 16 a length of initially unthreaded uniform cross-section metal bar stock from which a series of the inserts 10 are successively formed by appropriate machining on a screw machine or the like. The initial bar stock 16 has the cross-section illustrated in FIG. 3, to form a series of identical circularly successive peaks 17 and intermediate identical recesses 18. The peaks 17 may be curved arcuately about individual centers 19, and at a radius which is substantially less than the radial distance of each peak 17 from main axis 20 of the bar stock. Similarly, the recesses 18 may curve progressively and generally arcuately, but preferably at relatively short radii.

The first step in manufacture of the insert may be to externally thread an end portion 21 of bar stock 16 by a thread cutting tool represented at 121, with a thread having a major diameter coinciding with the maximum diameter of peaks 17, and having a modified minor diameter slightly closer to axis 20 than are the innermost portions of recesses 18. This end threaded portion is of a length to form a single one of the inserts 10, and after threading is cut off in a transverse plane, as indicated at 22 in FIG. 2. The external threads desirably have a taper in axial cross-section (FIG. 1) which is substantially less than the standard 60 degree taper, and is preferably approximately 40 degrees.

After the external threading operation, the removed partially completed insert is held within a collet or chuck while the internal threads 15 are formed therein, by a suitable tapping tool. The collet or chuck grips the insert only within the deepest portions of the recessed areas 18, by gripping fingers represented in broken lines at 23 in FIG. 4. Such holding of the insert within the depth of the recesses avoids damage to the critically dimensioned peak areas 17. Further, gripping of the insert in the recessed locations is highly important for preventing inward deformation of any burrs which may be formed on the peak portions of the thread during the threading operation. In this connection, it has been found that the formation of burrs on the thread during the threading step is essentially impossible to avoid. The burrs when first formed project outwardly a short distance from the threads as is represented diagrammatically at 117 in FIG. 4, and in that outwardly projecting condition can be subsequently removed by a tumbling operation. However, if the insert is gripped at the peak location by a collet or chuck, the burrs are deformed inwardly, between the threads, and cannot then be easily removed by a tumbling operation, and thereafter will distort or gall the carrier part into which the insert is screwed, in a manner detracting from or completely eliminating the self locking action of the insert with respect to the carrier part.

The external threads are appropriately chamfered at the opposite ends 24 and 25 of the insert, with these chamfers typically being formed on the bar stock prior to the external threading operation.

After the insert has been completely threaded internally and externally, and preferably after the insert is cut from bar stock 16, the side wall of the insert is locally deformed inwardly at one or more areas such as those represented at 26 and 27 in the figures. This deformation may be effected by striking radially inward blows, toward axis 20, against localized areas of the insert body by means of deforming hammers typically shaped as represented at 28 in FIGS. 4, 5 and 7. Desirably, the striking or deforming portions 29 of hammers 28 have inner planar surfaces 38 which are essentially rectangular, being elongated axially of the insert, that is, parallel to axis 20, and having shorter dimensions circularly about axis 20, to form axially elongated inwardly deformed areas as represented at 26 and 27. During the striking action of hammers 28, the insert may be held by the gripping fingers 23 received within certain of the inwardly recessed areas 18, or may be otherwise located relative to the hammers. In the presently preferred method, the insert is merely supported on the lower hammer 28 of FIG. 4, which is at all times stationary, and the upper hammer is then brought downwardly to effect the deforming action.

As will be clearly apparent from FIG. 4, the hammers 28 strike the outer surface of the insert at the locations of certain of the minimum radius recessed portions 18 of the threads, and preferably at points approximately midway between the opposite ends of the insert. At these locations, the outer surface of the insert is deformed radially inwardly, and the corresponding radially opposite portions of internal threads 15 are locally deformed radially inwardly, as illustrated at 30 in FIG. 5. The axial extent of the inwardly deformed area should be great enough to deform inwardly a plurality of turns of the inner threads, and for best results should be at least about as great as the axial lead of the external threads, from one turn to the next. The two recessed areas 26 and 27 may be diametrically opposite one another, with the area 26 deforming inwardly the minimum diameter external surface 18 of each of two successive turns of the external thread, and the intermediate cylindrical modified minor diameter surface 31 (FIG. 5), and with the area 27 at the opposite side (FIG. 6) crossing only one of the thread turns and the two adjacent cylindrical areas 31. After complete formation of the insert, it may be tumbled or otherwise treated to remove the burrs.

As brought out in FIGS. 4, 5 and 7, each hammer 28 may have two axially aligned essentially planar shoulders or surfaces 39 beyond opposite ends of the deforming portion 29 of the hammer, and offset radially outwardly relative thereto. These surfaces 39 engage the recessed areas 18 which are aligned axially with but are axially beyond those to be deformed by portion 29, to thereby limit the depth of the deformation formed by portion 29.

As they appear in transverse cross section (see FIG. 4), hammers 28 may taper radially inwardly toward axis 20, with the taper typically being uniform along the entire length of each hammer, including its portion 29 and its extensions carrying surfaces 39. Portion 29 may also taper in axial section, as is indicated at 40 in FIGS. 5 and 7, so that both the side walls 41 and end walls 42 of recesses 26 and 27 taper radially inwardly toward axis 20. If a deformation is desired at only one side of the insert, one of the elements 28 may be shaped to serve merely as a backing element, without a projecting portion 29, to engage within one set of the recesses 18 and take the force of a blow imparted by the opposed hammer 28.

To describe the configuration of the external threads of the insert somewhat more specifically, it is noted that, in the ultimate form of the insert, the external threads are progressively truncated by what was originally the outer waving surface of bar stock 16, to form truncating outer surfaces 32 on the threads which progressively widen in advancing radially inwardly from peak locations 17 to minimum radius recessed areas 18 (FIG. 1). At the locations of peaks 17, the threads may extend radially outwardly to essentially sharp edges 33. As brought out clearly in FIG. 5, each of the minimum radius portions 18 of outer surface 32 may be described as being recessed radially inwardly beyond a plane 37 which is drawn to just touch or be tangent to the two adjacent peaks. The minor diameter portions 31 of the external threads may be at a diameter slightly inwardly of recesses 18, as will be apparent from a consideration of FIG. 5. It is also noted that the indented portions of the outer surface of the insert at 26 and 27 are preferably at a radius with respect to main axis 20 which is closer to that axis than are the undeformed portions of minor diameter surface 31 of the external thread.

To now describe the use of the insert, the carrier part 12 into which the insert is to be screwed is bored to a diameter 11 which is substantially smaller than the diameter of the external threads 14 of the insert, at their peak areas 17, but is slightly larger than the diameter of the threads at their recessed areas 18, and is considerably larger than the diameter at indented locking areas 26 and 27. The insert is turned and advanced axially with respect to the carrier part, to screw the external thread into bore 11, and form mating threads in bore 11, at 35. These threads are formed by the action of rounded peaks 17, and their outer surfaces 32, which progressively cam the engaged portions of the material of carrier part 12 radially outwardly, as the insert is turned, to provide a mating thread 35 of appropriate cross-section. As each peak passes a particular portion of the thread, the material of the carrier part tends to return slightly radially inwardly at a location circularly behind the peak, to effectively lock the insert against unscrewing movement after the insert has reached its fully installed position within bore 11.

Since the inward deformations 26 and 27 are formed in the inwardly recessed portions 18 of the threads, which portions are spaced inwardly from and do not touch the inner surface of bore 11, the distortion of the insert at locations 26 and 27 cannot affect the manner of engagement of the outer peak portions 17 of the threads with the carrier part, and therefore cannot detract from the amount of back-out torque required to unscrew the insert after its installation. Also, since the recessed areas 18 at points other than the deformed locations 26 and 27 are also spaced inwardly from the inner surface of bore 11, any distortion of burrs at these recessed areas 18 by the collet or chuck fingers 23 of FIG. 4, cannot result in any change in the relationship of the insert to the carrier part.

After the insert has been fully installed, there is screwed into the insert a stud 36 having threads mating with threads 15, and which have an interference fit at the localized areas 30 of FIG. 5, to securely lock the stud in the insert. Thus, an effective internal lock has been provided without adverse effect on the proper functioning of the external threads.

FIG. 8 is a view similar to FIG. 4, but showing a variational arrangement which attains some but not all of the advantages of the form of the invention shown in FIGS. 1 through 6. The insert 10a of FIG. 8 may be considered as identical with that of FIGS. 1 through 6, except that the initial cross-section of the bar stock utilized in forming the insert (stock 16 of FIG. 2) is of essentially hexagonal configuration, rather than externally waving shape. As a result, the outer surfaces 32a of the threads are not recessed inwardly beyond planes which just touch adjacent peaks 17a, but rather coincide with those planes. As in the first form of the invention, the deformations 26a are formed at the locations at which surfaces 32a have their minimum radius, that is midway between successive peaks 17a, to form inward locking deformations 30a in the internal threads at those points.

I claim:

1. An insert comprising a generally tubular body having external threads to be screwed into a carrier part and having internal threads for reception of a coacting stud or the like, said external threads being centered essentially about a predetermined axis and having radially outer surfaces of non-circular cross-sectional shape defining a series of radially outwardly projecting peaks on the external threads spaced circularly about said axis, said external threads having their maximum radial thickness at said peaks, said outer surfaces, in advancing circularly between two successive peaks, being shaped to first advance progressively radially inwardly and then advance radially outwardly relative to said axis and relative to the minor diameter of said external threads, and to thereby truncate the external threads so that they first progressively decrease in radial thickness and then increase in radial thickness in extending between the outermost portions of two peaks, said outer surfaces having minimum radius portions located circularly between said peaks and at which said surfaces are nearest to said axis, individual ones of said minimum radius portions of said outer surfaces being recessed radially inwardly beyond a plane which is drawn to just touch the two adjacent peaks, said outer surfaces increasing in axial width as they advance radially inwardly, the wall of said generally tubular body being locally deformed radially inwardly at the location of one of said minimum radius portions and directly circularly between two circularly successive peaks and to an extent locally reducing the external radius at that location to a value less than the radius at others of said minimum radius portions between other circularly successive peaks, and locally reducing the diameter of said internal threads radially opposite said location to a value less than other portions of said internal threads, to provide a frictional lock with said stud.

2. An insert comprising a generally tubular body having external threads to be screwed into a carrier part and having internal threads for reception of a coacting stud or the like, said external threads being centered essentially about a predetermined axis and having radially outer surfaces of non-circular cross-sectional shape defining a series of radially outwardly projecting peaks on the external threads spaced circularly about said axis, said external threads having their maximum radial thickness at said peaks, said outer surfaces, in advancing circularly between two successive peaks, being shaped to first advance progressively radially inwardly and then advance radially outwardly relative to said axis and relative to the minor diameter of said external threads, and to thereby truncate the external threads so that they first progressively decrease in radial thickness and then increase in radial thickness in extending between the outermost portions of two peaks, said outer surfaces having minimum radius portions located circularly between said peaks and at which said surfaces are nearest to said axis, individual ones of said minimum radius portions of said outer surfaces being recessed radially inwardly beyond a plane which is drawn to just touch the two adjacent peaks, said outer surfaces increasing in axial width as they advance radially inwardly, the wall of said generally tubular body being locally deformed radially inwardly at the locations of two of said minimum radius portions which are spaced circularly apart and are each directly between two circularly successive peaks and are deformed to an extent locally reducing the external radius at those locations to a value less than the radius at others of said minimum radius portions between other circularly successive peaks, and locally reducing the diameter of said internal threads radially opposite said locations to a value less than other portions of said internal threads, to provide a frictional lock with said stud.

3. An insert comprising a generally tubular body having external threads to be screwed into a carrier part and having internal threads for reception of a coacting stud or the like, said external threads being centered essentially about a predetermined axis and having radially outer surfaces of non-circular cross-sectional shape defining a series of radially outwardly projecting peaks on the external threads spaced circularly about said axis, said external threads having their maximum radial thickness at said peaks, said outer surfaces, in advancing circularly between two successive peaks, being shaped to first advance progressively radially inwardly and then advance radially outwardly relative to said axis and relative to the minor diameter of said external threads, and to thereby truncate the external threads so that they first progressively decrease in radial thickness and then increase in radial thickness in extending between the outermost portions of two peaks, said outer surfaces having minimum radius portions located circularly between said peaks and at which said surfaces are nearest to said axis, individual ones of said minimum radius portions of said outer surfaces being recessed radially inwardly beyond a plane which is drawn to just touch the two adjacent peaks, said outer surfaces increasing in axial width as they advance radially inwardly, the wall of said generally tubular body being deformed radially inwardly over a localized area which is longer axially than circularly and crosses one of said minimum radius portions directly circularly between two circularly successive peaks to locally reduce the external radius of that location between said peaks to a value less than the radius at others of said minimum radius portions between other circularly successive peaks, and correspondingly locally reducing the diameter of said internal threads radially opposite said location to a value less than the radius at others of said minimum radius portions, to thereby provide a frictional lock with said stud.

4. An insert as recited in claim 1, in which said localized reduction in diameter of said internal threads continues through an axial extent corresponding to at least two turns of said internal threads.

5. An insert comprising a generally tubular body having external threads to be screwed into a carrier part and having internal threads for reception of a coacting stud or the like, said external threads being centered essentially about a predetermined axis and having radially outer surfaces of non-circular cross-sectional shape defining a series of radially outwardly projecting peaks on the external threads spaced circularly about said axis, said external threads having their maximum radial thickness at said peaks, said outer surfaces, in advancing circularly between two successive peaks, being shaped to first advance progressively radially inwardly and then advance radially outwardly relative to said axis and relative to the minor diameter of said external threads, and to thereby truncate the external threads so that they first progressively decrease in radial thickness and then increase in radial thickness in extending between the outermost portions of two peaks, said outer surfaces having minimum radius portions located circularly between said peaks and at which said surfaces are nearest to said axis, said outer surfaces increasing in axial width as they advance radially inwardly, the wall of said generally tubular body being locally deformed radially inwardly at the location of one of said minimum radius portions and directly circularly between two circularly successive peaks and to an extent locally reducing the external radius at that location to a value less than the radius at others of said minimum radius portions between other circularly successive peaks, and locally reducing the diameter of said internal threads radially opposite said location to a value less than other portions of said internal threads, to provide a frictional lock with said stud.

References Cited by the Examiner

UNITED STATES PATENTS

| | | |
|---|---|---|
| 2,352,982 | 7/44 | Tomalis _____ 151—22 |
| 2,754,871 | 7/56 | Stoll. |
| 3,103,962 | 9/63 | Neuschotz. |

FOREIGN PATENTS 210,236  7/60  Austria.

EDWARD C. ALLEN, *Primary Examiner.*